United States Patent [19]
Suntop

[11] 3,932,712
[45] Jan. 13, 1976

[54] TELEPHONE TRANSMISSION SYSTEM

[75] Inventor: Morris A. Suntop, Rochester, N.Y.

[73] Assignee: Stromberg-Carlson Corporation, Rochester, N.Y.

[22] Filed: Feb. 7, 1974

[21] Appl. No.: 440,504

Related U.S. Application Data

[63] Continuation of Ser. No. 262,816, June 14, 1972, abandoned, which is a continuation-in-part of Ser. No. 139,734, May 3, 1971, abandoned.

[52] U.S. Cl.............................. 179/170 R
[51] Int. Cl.²................. H04B 1/54; H04B 1/58
[58] Field of Search........ 179/170 R, 170 A, 170 D, 179/170 J, 170 HF, 170 T, 2.5 R, 41 A; 333/28 R, 32

[56] References Cited
UNITED STATES PATENTS

| | | | |
|---|---|---|---|
| 2,049,195 | 7/1936 | Chesnut............................ | 179/170 A |
| 2,207,531 | 7/1940 | Botsford........................... | 179/170 R |
| 2,282,465 | 5/1942 | Edwards........................... | 179/170 D |
| 2,300,415 | 11/1942 | Green................................ | 179/170 A |
| 2,781,417 | 2/1957 | Bower............................... | 179/170 R |
| 2,812,388 | 11/1957 | Thomas............................ | 179/170 J |
| 2,854,514 | 9/1958 | Ensink et al..................... | 179/170 J |
| 2,870,271 | 1/1959 | Cronburg, Jr. et al.......... | 179/170 T |
| 2,947,952 | 8/1960 | Hughes............................ | 179/170 D |
| 3,215,788 | 11/1965 | Oswald............................ | 179/170 D |
| 3,410,965 | 11/1968 | Sudo et al....................... | 179/84 R |
| 3,413,413 | 11/1968 | Peisl................................. | 178/69 |
| 3,456,206 | 7/1969 | Kwartiroff et al.............. | 333/32 |
| 3,510,584 | 5/1970 | Krasin et al..................... | 179/2.5 R |
| 3,700,817 | 10/1972 | Garcia et al.................... | 179/2.5 R |
| 3,778,563 | 12/1973 | Bise et al........................ | 179/170 D |

*Primary Examiner*—Kathleen H. Claffy
*Assistant Examiner*—Randall P. Myers
*Attorney, Agent, or Firm*—Donald R. Antonelli; William F. Porter, Jr.

[57] ABSTRACT

A telephone system comprises a non-loaded, non-equalized cable interconnecting a pair of communication terminals so that audio signals are translated in one direction and modulated carrier signals are translated in the other direction. A direct current bypass circuit is provided at each terminal to allow the transmission of direct current supervisory signals and battery potential over the non-loaded, non-equalized cable.

8 Claims, 8 Drawing Figures

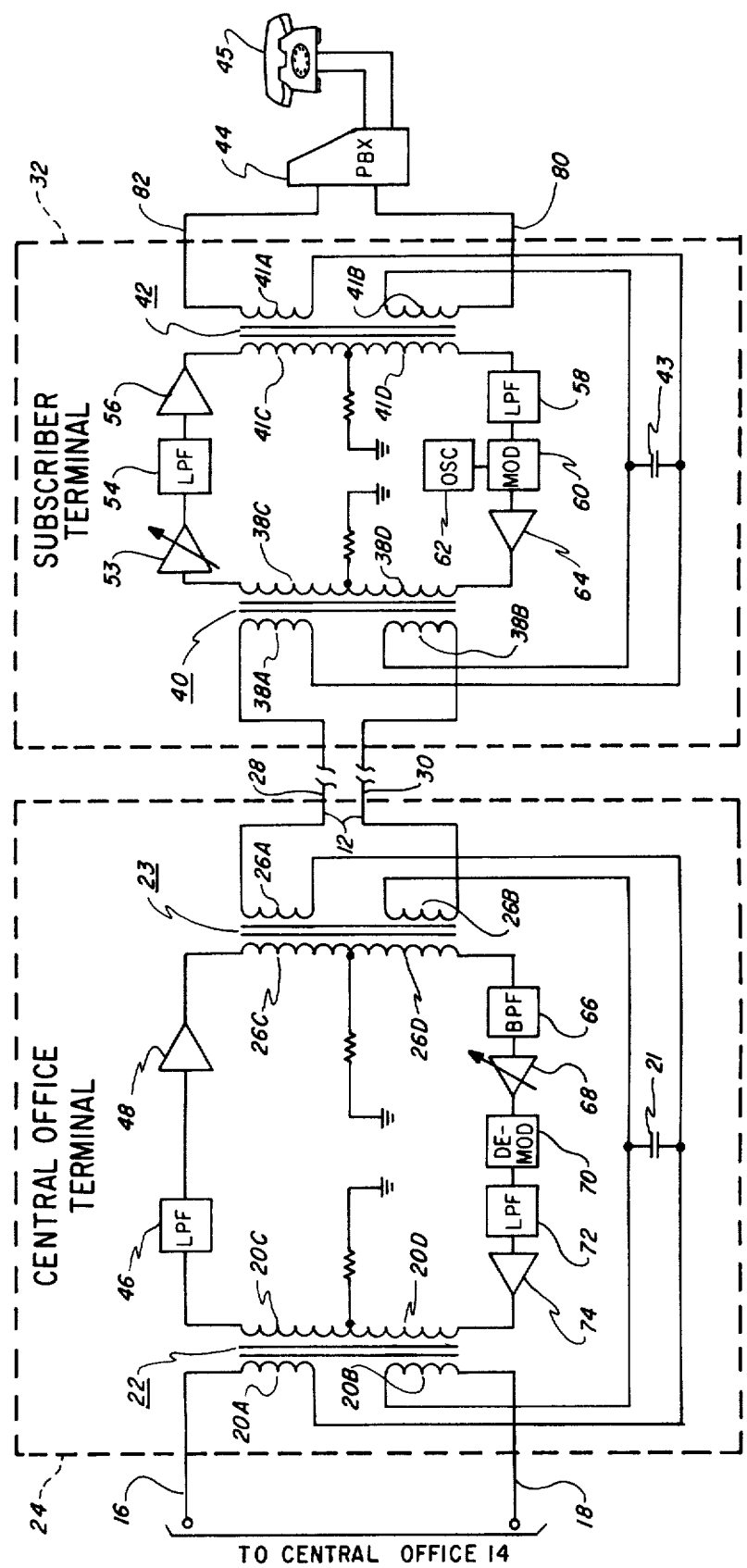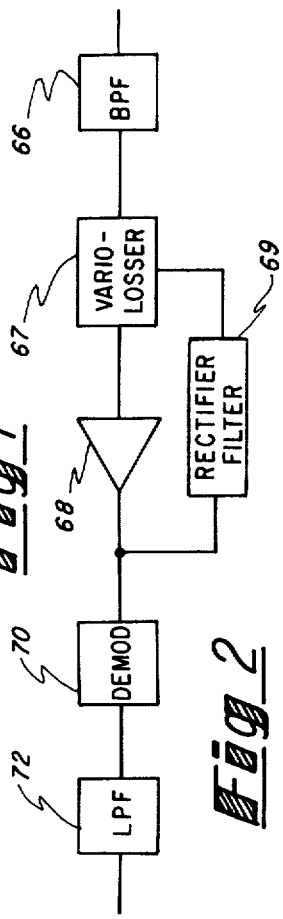
Fig. 1
Fig. 2

TELEPHONE TRANSMISSION SYSTEM

CROSS-REFERENCE TO RELATED APPLICATION

This is a continuation of application Ser. No. 262,816 filed June 14, 1972, now abandoned.

Ser. No. 262,816 is a Continuation-In-Part of my copending patent application titled "Telephone Transmission System", Ser. No. 139,734, filed on May 3, 1971, now abandoned, and assigned to the same assignee of this patent application.

BACKGROUND OF THE INVENTION

1. Field of the Invention

This invention relates to two-wire telephone systems in general and, in particular, to the transmission of direct current supervisory signals, and audio and modulated carrier signals, between terminals interconnected by a two-wire and/or non-equalized, non-loaded cable.

2. Description of the Prior Art

The increase in cost of labor, material and equipment has substantially increased the desirability of utilizing finer gauge wire for telephone circuits between central offices, and between a central office and subscribers' telephone sets connected thereto. However, the use of finer gauge wire also increases the reactance and resistance of the transmission lines. To control the series impedance of transmission lines, some prior art systems employed inductive and/or a capacitor loading circuit to tailor the impedance and frequency response of individual lines to provide a predetermined characteristic. The use of the loading circuits is expensive, particularly in the labor installation costs. Even after installation, records must be maintained on each of the load coils to provide an indication of the status of the line so that when parties are added or removed from the line the impedance of the line can be properly adjusted to provide the proper characteristics. Hence, the removal of the load coils, as well as the addition of the coils, is an expensive procedure.

Some other prior art systems employ negative impedance repeaters, either in the central office, or in the cable. In such cases, the impedances in the telephone circuit must be matched to provide proper operation. In addition, a filter arrangement is employed to get a flat response in the voice band. However, the negative impedance repeaters often lack sufficient gain, and increasing the gain of these units beyond a preset level may lead to instability. The negative impedance repeaters for the line circuits must be adjusted to the individual line characteristics of each circuit of the cable. The use of negative impedance repeaters requires a constant knowledge of up-to-date line circuit makeup and often time consuming readjustments.

Other prior art telephone circuits have embodied either line equalizing means, or four-wire telephone circuits utilizing hybrid repeaters, or subscriber carrier circuitry.

An object of this invention is to provide a new and improved circuit means for transmitting supervisory and voice, and/or data signals over extended lengths of two-wire transmission lines without requiring the use of equalizers, negative impedance converters, or the like.

Another object of this invention is to provide a new and improved two-wire telephone communication circuit comprising an extended non-loaded, two-wire cable interconnecting telephone terminals which minimizes the deficiencies and high costs of the prior art two-wire and four-wire circuits.

Another object of this invention is to provide a new and improved two-wire telephone circuit comprising an extended two-wire non-loaded cable interconnecting terminals for transmitting DC supervisory, control and ringing signals and voice, and/or data signals in different frequency ranges.

A further object of this invention is to provide a new and improved telephone circuit comprising an extended two-wire non-loaded cable interconnecting any combination of two-wire configured terminals, four-wire configured terminals and a two-wire configured terminal with a four-wire configured terminal for transmitting DC supervisory, control and ringing signals and voice, and/or data signals in different frequency ranges.

SUMMARY OF THE INVENTION

The invention provides a system for interconnecting a pair of communication circuits via a non-loaded two-wire line.

One of the communications circuits includes an input circuit for receiving audio signals, and means for applying the audio signals to the two-wire line. Additional circuit means are provided for receiving audio modulated carrier signals from the two-wire line and applying the demodulated signals to the input circuit. Direct current circuit means are also provided for the transmission of battery potential, supervisory and ringing signals between the input circuit and the two-wire line to the exclusion of audio and carrier signals. The second communications circuit includes an input circuit for receiving audio signals which are converted to modulated carrier signals and are applied to the two-wire line. Additional circuit means receive audio signals from the two-wire line and applies the same to the input circuit. Direct current circuit means provide for the transmission of battery potential and supervisory and ringing signals between the two-wire line and input circuit to the exclusion of audio and carrier signals.

The input circuits to the interconnected communication circuits can have two-wire or four-wire configuration or any combination thereof. Battery potential, supervisory and ringing signals can be applied to the two-wire input circuits or, in case of four-wire circuits by a separate two-wire input circuit.

BRIEF DESCRIPTION OF THE DRAWINGS

FIG. 1 is an overall block diagram of a telephone system embodying the teachings of this invention;

FIG. 2 is a block diagram of an alternate embodiment of a portion of the circuit of FIG. 1;

DESCRIPTION OF THE PREFERRED EMBODIMENT

Figure 3:
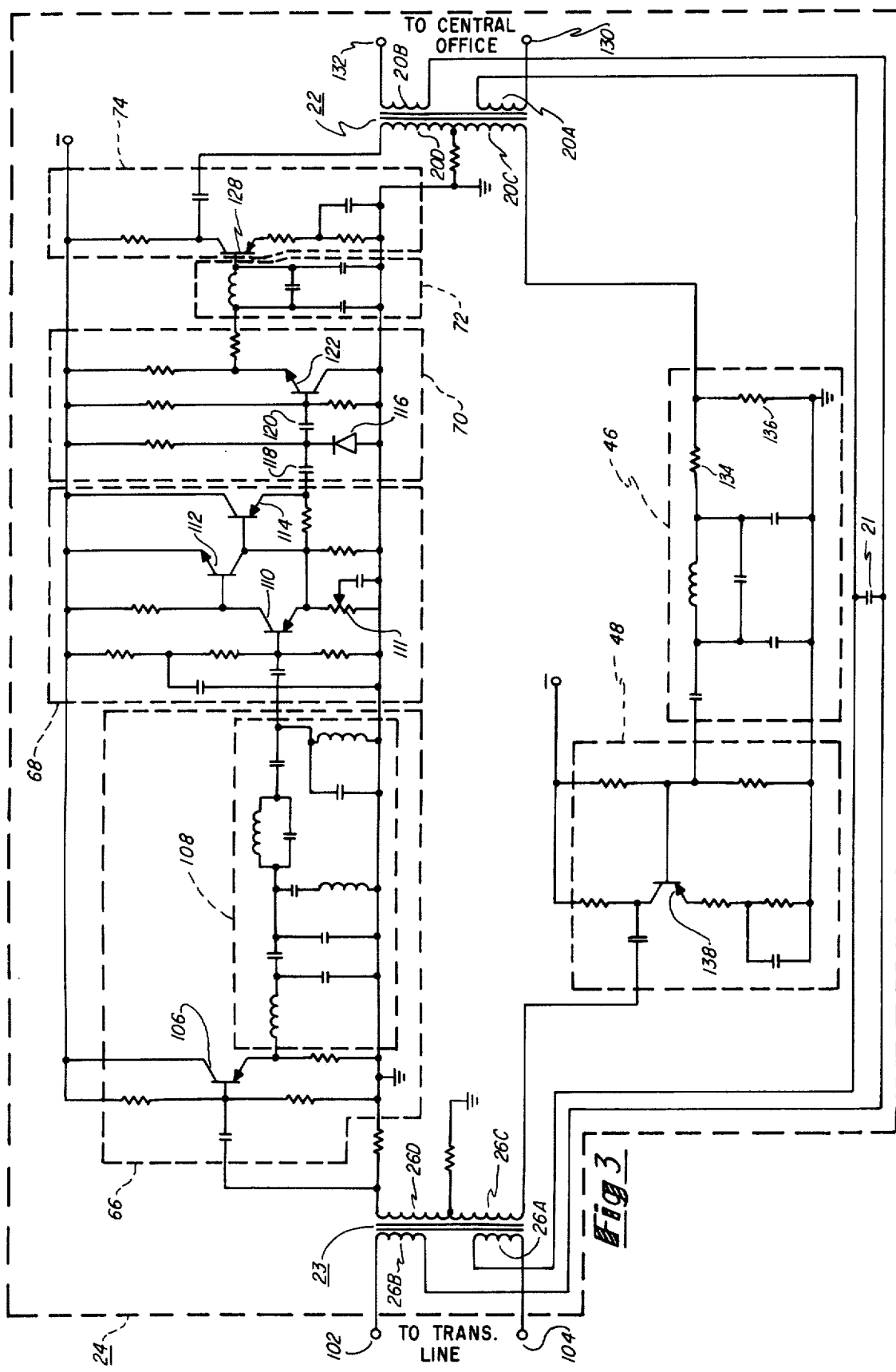
FIG. 3 is a schematic diagram of the central office terminal of FIG. 1.

With reference to FIG. 1, there is shown a telephone system comprising extended non-loaded, non-equalized, two-wire line or cable means 12 for transmitting audio and/or data signals between terminals connected to opposite ends of the cable and means for providing a direct current bypass path around the terminals for transmitting direct current (DC) supervisory signals and battery potential over the cable 12. The telephone cable 12 includes the wires 28 and 30 of a suitable wire gauge, such, for example, as 24 or 26 American Wire Gauge. The term non-loaded, non-equalized cable 12 implies that the telephone line comprising the wires 28 and 30 does not contain any loading or equalizing circuits incorporated therein to shape the reactive frequency response of the line. The non-loaded, non-equalized cables can, for example, be a long line that can extend in the order of 30,000 feet. One end of the cable 12 is connected to a central office terminal 24 and the other end is connected to a subscriber terminal 32, however, it is to be understood that the arrangement can also apply between central office terminals. In the embodiment illustrated, audio frequency range signals (200 to 3,000 hertz) are transmitted from the central office terminal 24 and received at the subscriber terminal 32, while modulated carrier signals (8 to 16 kilohertz) are transmitted from the subscriber terminal 32 and received at the central office terminal 24. However, it should be understood that the operation can be reversed and the frequency ranges can vary. In addition, a DC path is provided between the input circuits connected to the terminals for the transmission of supervisory, control and ringing signals and battery current.

The line connected to the central office terminal 24 comprises a tip lead 16 and a ring lead 18 which are seized by the switching equipment in the central office (not shown) to send ringing signals and to apply battery to the telephone line. When the telephone set 45 is called, a ringing signal (high level AC signal approximately 30 hertz superimposed on the central office battery) is applied across the tip and ring leads 16 and 18. The ringing signal causes a ringing current to flow through a DC path between the central office 24 and the subscriber terminal 32 including: (1) the windings 20A and 20B of a hybrid transformer 22, (2) the windings 26A and 26B of a hybrid transformer 23, (3) the non-loaded cable 12 including the pair of telephone wires 28 and 30, (4) the windings 38A and 38B of a hybrid transformer 40, and (5) the windings 41A and 41B of a hybrid transformer 42. The ringing current is then applied via a suitable connecting means such, for example, as a private branch telephone exchange (PBX) 44, or a direct connection, to the telephone set 45 to actuate a ringer in the telephone set. The frequency response of the transformers 22, 23, 40 and 42 is such that they allow the ringing signal to pass through the above described DC path and essentially inhibit the ringing signal from being transmitted by transformer action.

In a similar manner, when the telephone set 45 goes "off hook" to initiate a call through the central office 14, the central office applies battery potential to the PBX or telephone set 45 via the above described DC path. Dial pulses are applied to the central office by interrupting or opening the DC loop. Hence, it can be seen that the telephone circuit of this invention provides a DC connection between the two telephone circuits connected to the terminals 24 and 32 without any physical interruption of the transmission line therebetween, such as the use of relay contacts, etc.

When a telephone connection has been established between the subscriber's telephone set 45 and the equipment of the central office 14, audio signals such, for example, as voice signals, or data signals, are applied by the central office across the tip and ring lines 16 and 18 to the windings 20A and 20B of the hybrid transformer 22. The capacitor 21 functions as a low impedance (essentially a short) for audio and higher frequencies. The hybrid transformers 22, 23, 40 and 42 are standard well known units that are arranged so that there is a selective direction through which the signals are transmitted through the hybrid transformers. The audio signals are applied by the winding 20C of the transformer 22 to a low pass filter 46. The filter circuit 46 is a sharp break low pass filter such as, for example, one having an 18 db break at three kilohertz. The filter circuit 46 limits the frequency range of the audio to less than that of the frequency range of the carrier signals used in the transmission of signals in the opposite direction to prevent singing, echo return, etc. The filtered audio signals (in the range of 200 to 3,000 hertz) are then amplified by an amplifier 48 and are applied to the winding 26C. The gain of the amplifier 48 compensates for the circuit and line losses. The amplified audio signals from the windings 26A and 26B of the transformer 23 are applied to the pair of wires 28 and 30 of the nonloaded transmission line 12. The capacitor 21 functions as a low impedance path for interconnecting the windings 26A and 26B for audio and carrier signals.

The audio signals from the non-loaded telephone line 12 are applied via the windings 38A, 38B and 38C of the hybrid transformer 40 to an adjustable buffer amplifier 53. The capacitor 43 functions as a low impedance circuit to AC signals to interconnect the windings 38A and 38B. The amplified signals are applied to a low pass filter circuit 54. The filter 54 is similar to filter 46 and functions to pass the audio signal (200 to 3,000 hertz) and block the carrier signal. The audio signals from the filter circuit 54 are applied to an amplifier 56 which amplifies the audio signals to a desired level and applies the amplified signals to the winding 41C of the transformer 42. It is to be understood that although two amplifiers 53 and 56 are illustrated, a single amplifier could also be used. The filtered amplified audio signals are coupled via the windings 41A and 41B of the hybrid transformer 42 to the wires 80 and 82 comprising the telephone line extending to the private branch exchange 44 to which the subscriber telephone set 45 is connected (or directly to the telephone set 45). Once again the capacitor 43 functions as a low impedance to AC signals interconnecting the windings 41A and 41B.

Audio signals such, for example, as data and/or voice signals originated by the subscriber telephone set 45 are coupled to the windings 41A and 41B of the hybrid transformer 42 via the private branch exchange 44 (or directly from the telephone set). The audio signals from the winding 41D are applied to a low pass filter 58 (similar to filter 46) to apply a range of frequencies between 200 to 3,000 hertz to a modulator 60. The low pass filter 58, although not necessary, is a desirable feature for the circuit for limiting the frequency range of the audio signals below the carrier range. In the modulator 60, the data and/or voice signals are mixed with a carrier signal generated by a carrier oscillator 62 to produce a modulated carrier signal. A suitable modulated carrier signal may be, for example, single sideband carrier, frequency modulation, double sideband AM, and double sideband suppressed carrier. The preferred type of carrier frequency signal is double sideband AM.

The frequency range of the modulated carrier signals may be of any desirable frequency range limited by interference problems and line attenuation. The lowest frequency of the modulated carrier signal must be higher than the highest frequency of any of the audio signals being transmitted. Preferably, the frequency of the carrier signals is selected to fall within the range of 8 to 16 kilohertz to prevent interference from low frequency radio stations operating in the range of from 16 to 30 kilohertz.

The modulated carrier signals are amplified by a high frequency amplifier 64 and applied to the winding 38D. The gain of the amplifier 64 is sufficient to compensate for losses in the lines 28 and 30. The amplified modulated carrier signals are applied by the windings 38A and 38B of the hybrid transformers 40 to the non-loaded, non-equalized transmission line 12 (two-wire telephone lines 28 and 30).

The carrier signals are received by the windings 26A and 26B of the hybrid transformer 23 at the central office terminal 24. The incoming carrier signals are applied by the windings 26D to a bandpass filter 66 having break points in the order of 9 kilohertz and 15 kilohertz. The modulated carrier signals are amplified by a variable gain high frequency amplifier 68. The amplifier 68 is adjusted at the central office terminal 24 to maintain the level of the modulated signal applied to a demodulator 70 to a predetermined range of values. The circuit may incorporate a manually adjusted amplifier as shown in FIG. 1 requiring little readjustment, if any, once installed. Therefore, since the manually adjusted amplifier 68 provides simple operation along with economic benefits, it is the preferred embodiment.

An alternate circuit arrangement incorporating the amplifier 68 is shown in FIG. 2. Modifications of the circuit as shown in FIG. 2 provide an automatic gain control circuit. A vario-losser circuit 67 is connected in series between the bandpass filter 66 and the amplifier 68. A rectifier/filter circuit 69 is connected between the output of the amplifier 68 and the vario-losser circuit 67. The output from the feedback circuit 69 controls vario-losser 67 to automatically compensate for the input signal level variations.

The demodulator 70 applies the demodulated carrier frequency signals to a low pass filter circuit 72, similar to the filter circuit 46, to produce the audio signals. The audio signals are amplified by the amplifier 74 and applied to the winding 20D of the hybrid transformer 22. The windings 20A and 20B apply the received audio signals to the tip and ring wires 16 and 18, respectively, of the central office 14. From the central office the received audio signals are transmitted to the other party.

FIG. 3 includes a schematic diagram of the central office terminal 24 in an arrangement that is suitable for mounting on a single printed circuit plug-in board. For ease of explanation, the same reference numerals in FIGS. 1 and 3 refer to the same elements. Terminals 102 and 104 are adapted to be connected to the non-loaded, non-equalized cable 12 and provide a connection to the hybrid transformer 23. The windings 26A and 26B of the transformer 23 are connected to the windings 20A and 20B of the transformer 22 to provide the direct current bypass circuit around the central office terminal 24. The capacitor 21 provides the AC coupling between the windings 26A and 26B and also between the windings 20A and 20B. The carrier signals received from the non-loaded, nonequalized cable 12 are applied to the bandpass filter circuit 66. The bandpass filter circuit 66 includes an emitter-follower circuit (including a transistor 106) connected to apply the carrier signals to an L-C filter circuit 108. The output of the bandpass filter 66 is applied to the adjustable gain amplifier circuit 68 including the transistors 110, 112 and 114. The gain of the amplifier circuit 68 is varied by adjusting the potentiometer 111. The output of the amplifier circuit 68 is applied to a demodulator circuit 70 including a diode 116, capacitors 118 and 120 and a transistor 122. The demodulated signals are applied to low pass filter circuit 72 and an L-C filter circuit to produce the audio signals. The output from the filter circuit 72 is applied via the amplifier circuit 74 (including the transistor 128) to the winding 20D of the transformer 22, which, in turn, applies the audio signal to the telephone line extending to the central office via the windings 20A and 20B.

Terminals 130 and 132 are adapted to be connected to the tip and ring wires 16 and 18 of the telephone line extending to the central office. The audio signals received from the central office are applied across the windings 20A and 20B and are applied to the low pass filter 46 via resistors 134 and 136. The low pass filter 46 includes an L-C circuit. The output from the filter circuit 46 is applied to the amplifier 48, which includes a transistor 138. The amplified signals from the amplifier circuit 48 are applied to the winding 26C of the transformer 23 so that the audio signals are applied to the non-loaded cable 12 via the windings 26A and 26B.

Figure 4:
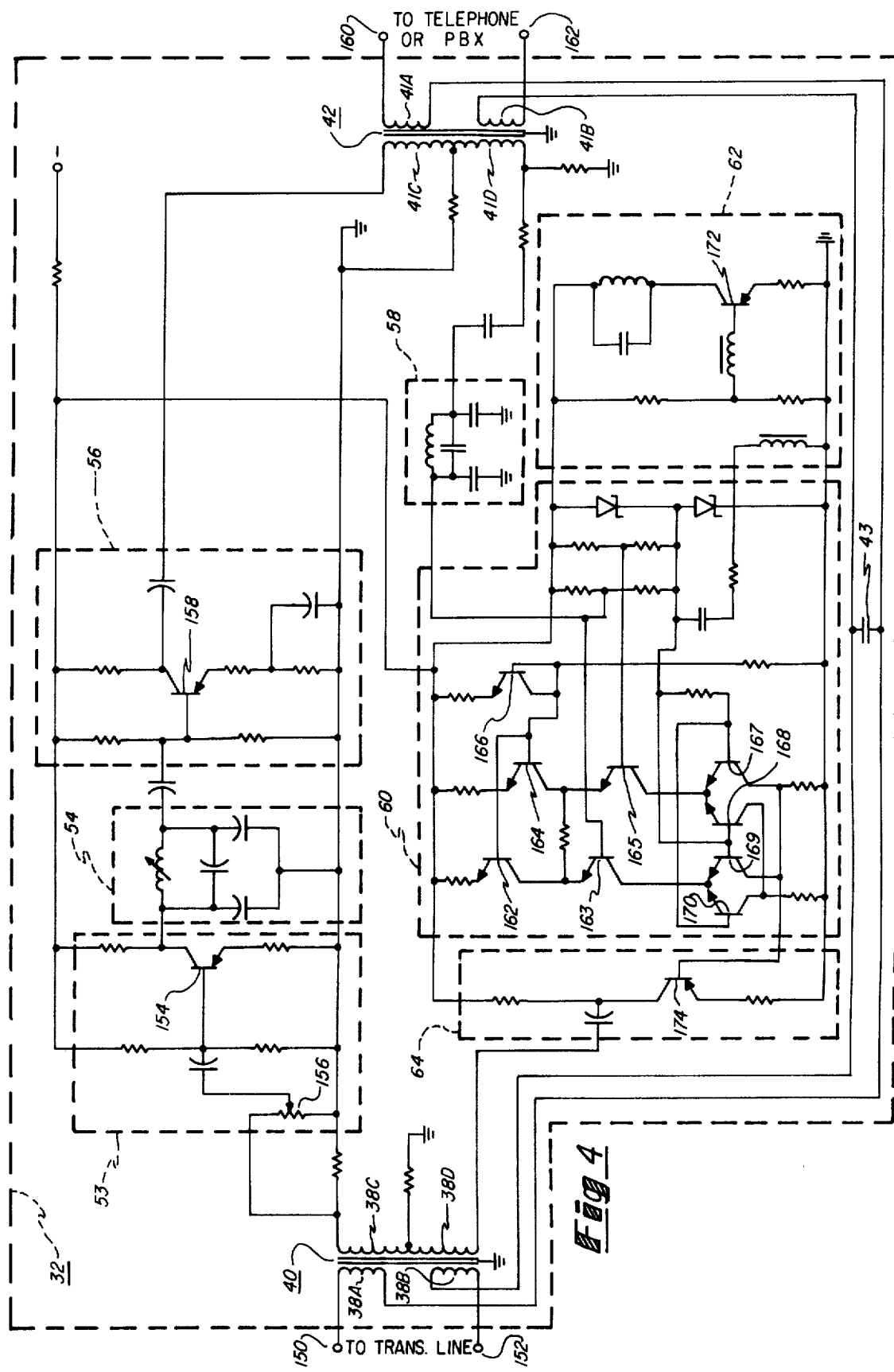
FIG. 4 is a schematic diagram of the subscriber terminal of FIG. 1.

FIG. 4 includes a schematic diagram of the subscriber terminal 32 in an arrangement that is suitable for mounting on a single printed circuit board. For ease of explanation, the same reference numerals in FIGS. 1 and 4 refer to the same elements. Terminals 150 and 152 are adapted to be connected to the non-loaded, non-equalized cable 12 to provide a connection to the windings 38A and 38B of the hybrid transformer 40. The windings 38A and 38B are connected to the windings 41A and 41B of the transformer 42 to provide a direct current bypass circuit around the subscriber terminal 24. The capacitor 43 provides the AC coupling between the windings 38A and 38B and also between the windings 41A and 41B. The audio signals received from the non-loaded, non-equalized cable 12 are applied to the adjustable audio amplifier circuit 53 including the transistor 154. The gain of the amplifier is adjusted by setting the potentiometer 156. The output from the amplifier 53 is applied to the low pass filter circuit 54 including an adjustable L-C filter arrangement. The filtered signals are then amplified by the amplifier circuit 56 (including the transistor 158) and are applied to the winding 41C. The audio signals are coupled through the transformer and are developed across terminals 160 and 162 (that are adapted to be connected to the PBX 44 or telephone set 45) via the windings 41A and 41B.

Audio signals from the PBX 44, or telephone set 45, are applied to the L-C filter circuit 58 via the transformer windings 41A, 41B and 41D. The output signals from the filter circuit 58 are applied to a standard, commercially available balanced modulator circuit 60 including the transistors 162-170. The oscillator 62 including the transistor 172 provides the carrier signal to the modulator circuit 60. The modulated carrier signals are amplified by the amplifier circuit 64 (including a transistor 174) and are applied to the winding 38D, which, in turn, are coupled to the transmission line via windings 38A and 38B.

Figure 5:
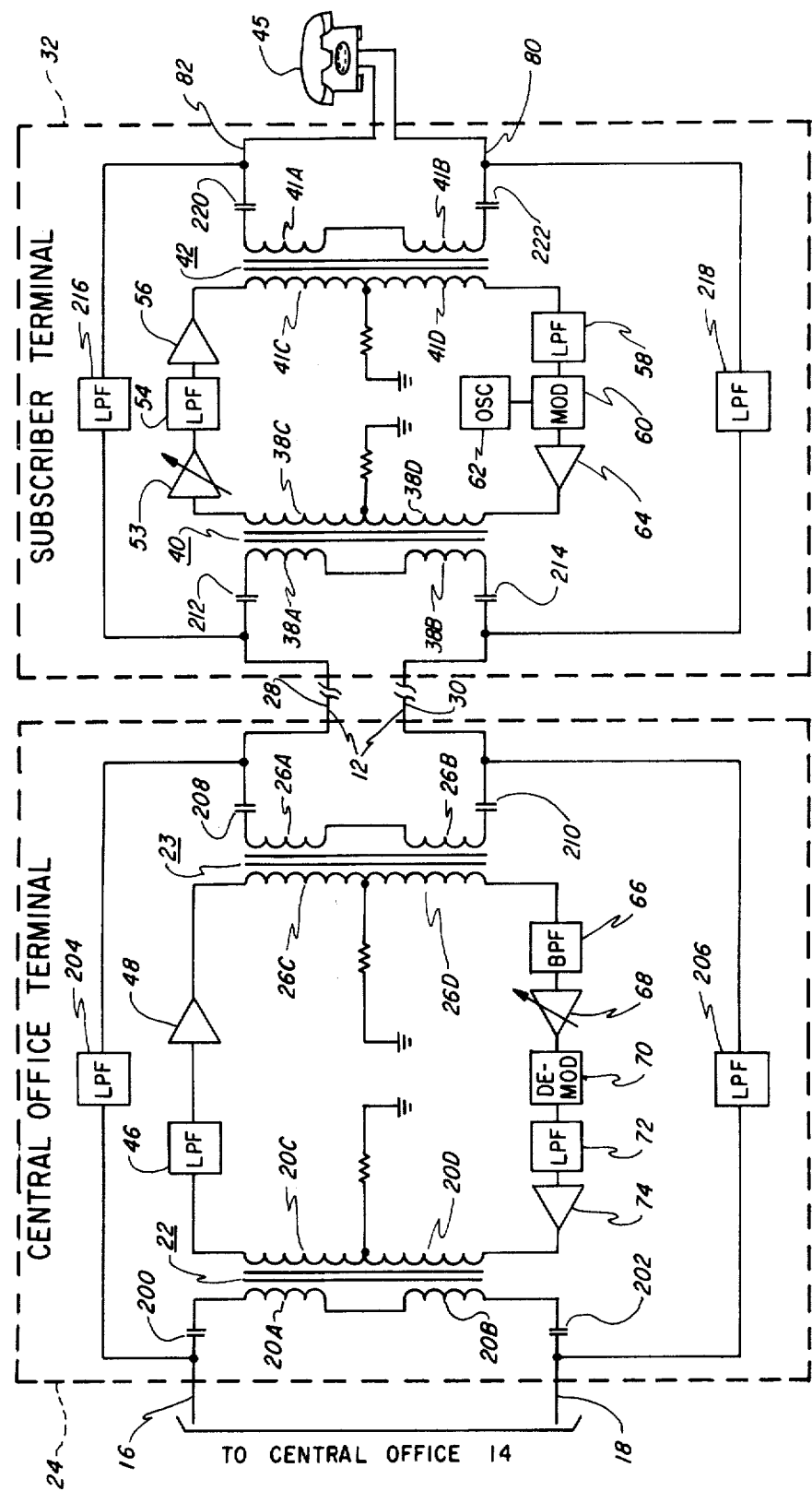
FIG. 5 is a schematic diagram of the telephone system of the invention including a second embodiment of a direct current bypass arrangement.

FIG. 5 includes a diagram of the telephone system of the invention including a second embodiment for the direct current path between circuits connected to opposite ends of the system. For purposes of simplifying the explanation of the system of FIG. 5, the same components in the systems of FIGS. 1 and 5 are designated by the same reference numerals.

The lines 16 and 18 are connected to the windings 20A and 20B of the hybrid transformer 22 via a pair of isolation capacitors 200 and 202 to allow audio signals to be transmitted to the hybrid transformer 22 and block any direct current flow through the windings. A low pass filter 204 designed to pass direct current supervisory, control and ringing signals is connected between the line 16 and the line 28 of the cable 12 while a similar low pass filter 206 is connected between the line 18 and the line 30. The lines 28 and 30 are connected to the windings 26A and 26B of the transformer 23 via the capacitors 208 and 210 to transmit audio and carrier signals and prevent direct current flow through the windings. The other end of the lines 28 and 30 are also connected to the windings 38A and 38B of the transformer 40 through the capacitors 212 and 214 for the same reasons.

In the same manner one of a pair of low pass filters 216 and 218 (identical to the filters 204 and 206) is connected between the lines 28 and 82, and between the lines 30 and 80, respectively. The lines 80 and 82 are connected to the windings 41A and 41B of the transformer 42 via the capacitors 220 and 222.

Hence, it can be seen that a direct current path is provided between the lines 16 and 82 via the low pass filters 204 and 216 and the line 28, while a direct current path is provided between lines 18 and 80 via low pass filters 206 and 218 and the line 30. The circuit of FIG. 5 functions in a similar manner as FIGS. 1-4, wherein the supervisory, control and ringing signals are transmitted through the above-identified direct current paths, while the audio and carrier signals are transmitted between the circuits connected to the opposite end of the terminals 24 and 32 in the same manner as described in the FIGS. 1-4, except for the capacitors 200, 202, 208, 210, 212, 214, 220 and 222, wherein the capacitors function as a low impedance path for audio and/or carrier signals while isolating the hybrid transformer windings from the direct current path.

It is to be understood that other types of direct current paths can also be employed with the telephone system of the invention, however, the direct current path disclosed in FIG. 1 is the preferred embodiment since a minimum of components are involved (no low pass filters, relay bypass circuits, etc.) resulting in lower cost. Furthermore, the use of the hybrid transformers to form a portion of the direct current path provide a simple means of maintaining an impedance balance in both sides of the direct current path.

The telephone system of this invention provides a combined audio, carrier and direct current communication system over a single two-wire, non-loaded, non-equalized cable. The two-wire circuit of this invention has all the advantages accrued to the prior art loaded line arrangements and/or four-wire circuits. The telephone system is substantially insensitive to variation gain. The telephone system of the invention provides suitable means whereby DC supervisory, control and ringing signals are transmitted between parties over a two-wire transmission line in a manner wherein the DC signals do not cause interference or distortion with the communications signals traversing the same line. The telephone system is also substantially stable and provides a balanced arrangement wherein both open and short circuits occurring within the system will not cause the system to become unstable. The distortion resulting from phase and attenuation characteristics of the non-loaded interconnecting cable causes negligible degraduation in service.

As shown in FIG. 1, the telephone system embodies a private branch exchange 44 in which the subscriber terminal 32 is located. However, the subscriber terminal 32 may be incorporated in or associated directly with an individual subscriber's set 45 provided a source of power is available to operate the terminal 32. The telephone system is also suitably employed wherein each terminal is located at a central office and a non-loaded trunk line or cable interconnects the two offices.

The telephone system of this invention requires minimal installation instructions for initial installation. The terminals can be maintained on printed circuit cards and plugged in where needed and once adjusted, will continuously function without readjustment. In addition, the telephone system of the invention is more efficient and has a better echo return loss, than the prior art circuits.

As described heretofore, a single non-loaded cable pair transmits two different frequency bands of AC signals and also direct current signals. One frequency band is in the low frequency spectrum, such, for example, as from 200 to 3,000 cycles for either voice or data signals. The second frequency band is a modulated carrier frequency of preferably from 8 to 16 kilohertz. Both frequency bands are transmitted in one direction only and opposed to each other. A direct current circuit bypasses the terminal to provide for the transmission of DC supervisory, control and ringing signals and battery.

The telephone system of this invention also embodies a means to reduce distortion. Such means is provided by deliberately mismatching the impedance of the cable 12 and the impedances as presented by each of the terminals 24 and 32 to the cable 12. In normal telephone circuitry, the impedance across the non-loaded cable 12 is approximately 900 ohms. The impedance presented by the terminals 24 and 32 to the cable 12 is approximately 150 ohms. This mismatch of impedances provide the advantage of a flattening in the frequency response of the cable 12. In addition to the foregoing, the terminals 24 and 32 have provision for matching the impedance of the terminals to the central office lines 16 and 18 and the subscriber lines 80 and 82. The amplifying circuits in each of the terminals 24 and 32 compensate for the losses. The amplifying circuits allows a large range of gain to be introduced at either end of the interconnecting non-loaded cable without causing instability. These amplifying circuits enable one to compensate for line losses in the cable without causing the system of the network to become unstable and cause ringing, echo, etc.

Figure 6:
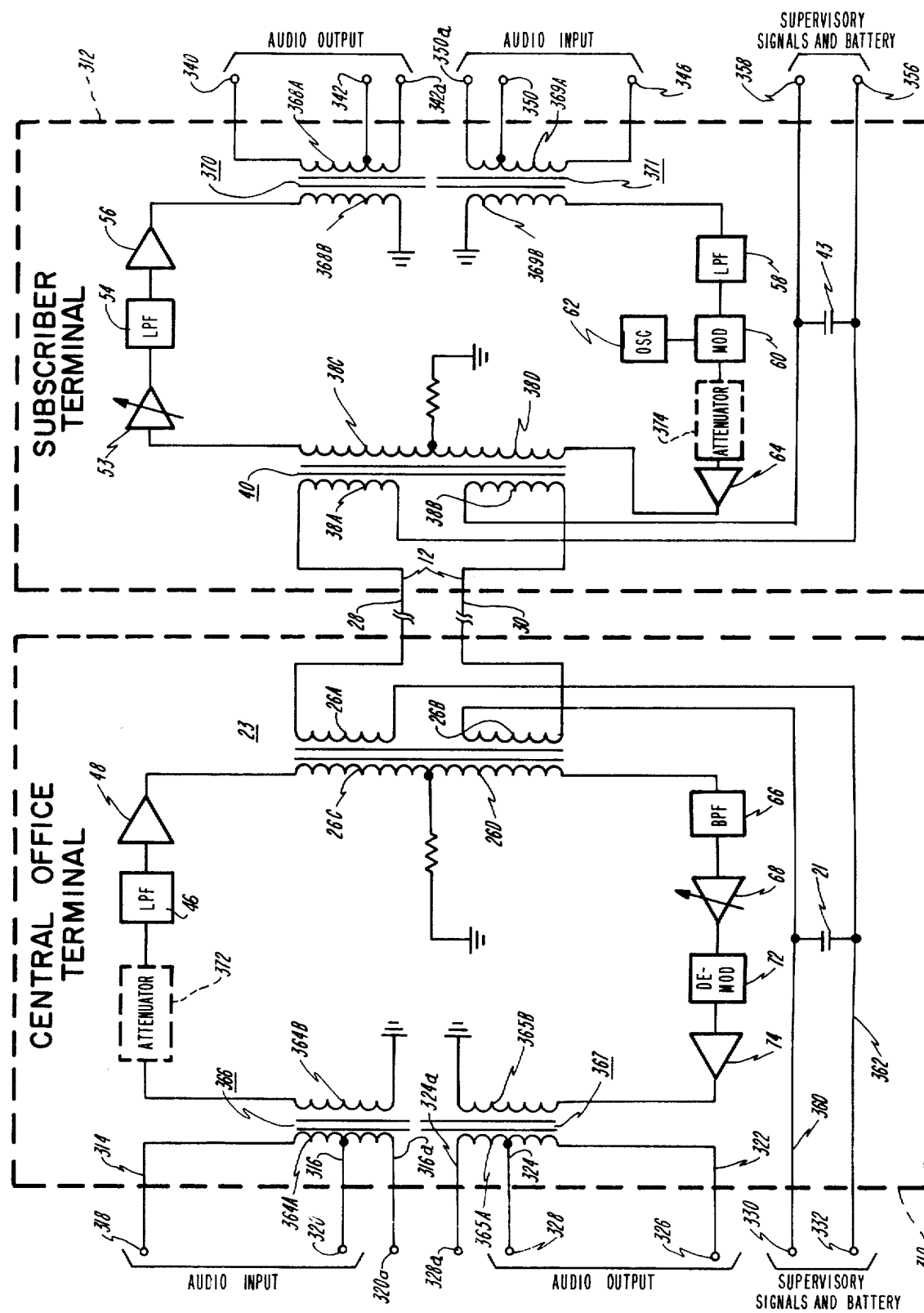
FIG. 6 is a block diagram of another embodiment of the telephone transmission system of FIG. 1 for connection to a four-wire telephone system.

The telephone transmission system of this invention is readily adaptable for employment wherein subscriber and central office terminals embody four-wire termination and originating circuits. With reference to FIG. 6, there is shown the application of this novel transmission system to a system embodying four-wire subscriber and central office terminals or communication circuits. For ease of explanation, the same components of the systems or circuits in FIGS. 1 and 6 are designated by the same reference numerals.

The telephone cable 12 connects a central office terminal or communication circuit 310 to a subscriber terminal or communication circuit 312. However, it is to be understood that the arrangement as shown may also be applied between two central office terminals. A modulated signal is transmitted from the subscriber terminal 312 to the central office terminal 310. Amplified voice frequency signals are transmitted from the central office terminal 310 to the subscriber terminal 312. The central office terminal 310 will accept suitable signals such, for example, as in the order of −16 decibels above 1 milliwatt power (dBM) or +7 dBM by employing suitable strapping means. In a similar manner, the central office terminal 310 will accept the demodulated received signals at a suitable signal level, such, for example, as in the order of −16 dBM or +7 dBM by employing suitable strapping means.

The connection between the central office terminal 310 and the switching equipment of the central office No. 1 or a PBX No. 1 comprises three pair of conductors and their respective connecting terminals. Tip and ring leads 314 and 316 comprise a first pair of conductors and are connected to a pair of respective input terminals 318 and 320. The impedance input match to the pair of conductors via terminals 318 and 320 is 600 ohms. Alternately, should a 900 impedance input match be necessary, the lead 316A serves as a ring lead and is connected to the switching equipment of the central office No. 1 via an input terminal 320a. In a like manner, tip and ring leads 322 and 324 respectively, comprise a second pair of conductors and are connected to the switching equipment of the central office No. 1 via a pair of output terminals 326 and 328 respectively. An impedance match of 600 ohms is provided between the switching equipment and the central office terminal 310 and the terminal 312 via the output terminals 326 and 328. An impedance match of 900 ohms, when required, is provided via the output terminal 326 and an alternate ring lead 324a and an alternate output terminal 328a. Supervisory signals are transmitted between the cable 12 and the central office terminal 310 and the switching equipment of the central office No. 1 via a pair of connecting terminals 330 and 332 and leads 360 and 362 comprising the third pair of conductors. Additionally, control and ringing signals as well as battery current may be transmitted by the pair of conductors. The capacitor 21 functions in the same manner as in FIG. 1.

The connection between the subscriber terminal 312 and the subscriber telephone system or the switching equipment of a central office No. 2 or a PBX No. 2 also comprises three pair of conductors and their respective connector terminals. The subscriber telephone system may comprise such as, for example, a private branch exchange or a telephone set or both. Tip and ring leads 336 and 338 respectively connect the subscriber terminal 312 via respective output terminals 340 and 342 to the appropriate switching equipment of the subscriber telephone system or the central office No. 2 as required. The impedance match of 600 ohms is provided via the output terminals 340 and 342 between the terminal 312 and the switching equipment. Alternately, should a 900 ohm impedance match be necessary, the lead 338a serves as ring lead and is connected to the switching equipment via an output terminal 342a. In a like manner the switching equipment of either one of the subscriber telephone system or the central office No. 2 is connected to tip and ring leads 334 and 346 respectively comprising a second pair of conductors via a pair of respective input terminals 348 and 350. An impedance match of 600 ohms is provided between the switching equipment and the terminal 312. An impedance match of 900 ohms is provided between the switching equipment and the terminal 312 via the input terminal 348 and alternate ring lead 346a and input terminal 350a. Supervisory signals are transmitted between the two-wire telephone cable and the switching equipment via leads 352 and 350 comprising the third pair of conductors of the subscriber terminal 312 and a pair of connector terminals 356 and 358. Additionally, control and ringing signals as well as battery current may be transmitted via the pair of conductors 356 and 358. The capacitor 43 functions in the same manner as in the circuit of FIG. 1.

When the subscriber telephone system or the central office No. 2 is called, a ringing signal (high level AC signal of a frequency of approximately 30 hertz superimposed on the central office battery) is applied across the leads 360 and 362 via the connector terminals 330 and 332. The ringing signal causes a ringing current to flow through a continuous electrical path between the central office terminal 310 and the subscriber terminal 312 including (1) the windings 26A and 26B of a hybrid transformer 23, (2) the non-loaded cable 12 including the pair of telephone wires 28 and 30 and (3) the windings 38A and 38B of a hybrid transformer 40. The ringing current is then applied via a suitable connecting means such, for example, as a private branch telephone exchange (PBX), or a direct connection, or also including one or more other central offices to a subscriber's telephone set (not shown) to activate a ringer in the telephone set. The frequency response of the transformer 23 and 40 is the same as in the response to the circuit of FIG. 1 wherein the transformers allow the ringing signal to pass through the above described DC path and essentially inhibit the ringing signal from being transmitted by transformer action.

In a similar manner, when a subscriber telephone set (not shown) goes "off hook" to initiate a call through the central office No. 2, the central office applies battery potential to the private branch exchange or subscriber telephone set (not shown) via the above described DC path. Dial pulses are applied to the central office by interrupting or opening the DC loop. Hence, it can be seen that the telephone circuit of this alternate embodiment of this invention provides a DC connection between the two telephone circuits connected together via the terminals 310 and 312 without any physical interruption of the transmission line therebetween, such as the use of relay contacts, etc.

When a telephone connection has been established audio signals such, for example, as voice signals, or data signals, are applied by the central office No. 2 across the tip and ring lines 314 and 316 or 314 and 316a to the winding 364A of the transformer 366. The audio signals are received by the winding 364A to the winding 364B and applied to the low pass filter 46. The filtered audio signals are then amplified by the amplifier 48 and applied to the winding 26C of the hybrid transformer 23. The amplified audio signals from the winding 364A are received by the winding 26A and applied to the pair of wires 28 and 30 of the non-loaded transmission or telephone line 12.

The audio signals from the non-loaded telephone line 12 are applied via the winding 38C to the gain controlled buffer amplifier 53 and thence to the low pass filter circuit 54. The audio signals from the filter circuit 54 are applied to the amplifier 56 which, as before, relative to the circuit of FIG. 1, amplifies the audio signals to a desired level and applies the amplified signals to a winding 368B of a transformer 370. It is to be understood, as in FIG. 1, that although two amplifiers 53 and 56 are illustrated, a single amplifier could also be used. The filtered amplified audio signals are coupled out via the winding 368A to either pair of output terminals 340 and 342 or 340 and 342a, depending on the desired output impedance.

Audio signals, such, for example, as data and/or voice signals are coupled to the winding 369A of the transformer 371 directly. The audio signals are coupled to the winding 369B and applied to the low pass filter 58. The filtered audio signals are transmitted to the modulator 60. As previously described relative to the circuit of FIG. 1, an oscillator 62 provides a suitable carrier signal to the modulator which in turn mixes the generated carrier signal and the data and/or voice signals to produce a modulated carrier signal. Any of the previously described modulated carrier signals and frequency ranges for the circuit of FIG. 1 is again suitable in this instance, a double sideband AM within the range of 8 to 16 kilohertz being preferred.

The modulated carrier signals are amplified by the high frequency amplifier 64 and applied to the winding 38D to be transformed to the windings 38A and 38B all windings being of the hybrid transformer 40, and applied to the non-loaded, non-equalized two-wire transmission line 12 comprised of the lines 28 and 30.

The modulated carrier signals are received by the windings 26A and 26B of the hybrid transformer 23 in the central office terminal 310. The incoming modulated carrier signals are applied by the winding 26D to the bandpass filter 66. The modulated carrier signals are amplified by a variable gain high frequency amplifier 68. As previously described, the amplifier 68 is adjusted at the central office terminal 310 to maintain the level of the modulated signal applied to the demodulator 70 to a predetermined range of values. Preferably the amplifier 68 is manually adjusted for the reasons previously described relative to the circuit of FIG. 1.

The circuit arrangement of FIG. 2 incorporating the amplifier 68 may, in the alternative, be incorporated in the circuitry of the terminal 310 to provide an automatic gain control circuit as previously described relative to its modification of the circuit of FIG. 1.

The demodulator 72 applies the demodulated carrier frequency signals to the amplifier 74 connected to the winding 365B of the transformer 367. The audio signals are coupled to the winding 365A and applied to the appropriate tip and ring leads of the output portion as determined by the impedance match.

As is typically normal in a four-wire telephone system the terminals 310 and 312 must be able to transmit in either a high level signal condition of approximately +7 dBM (number of decibels above 1 milliwatt power) or a low level signal condition of approximately −16 dBM. Therefore, it is desirable to employ attenuators 372 and 374 depicted as dotted line blocks, in the transmission portion of the respective terminals 310 and 312. During transmission in a high level signal condition, the attenuators 372 and 374 remain connected into the appropriate circuits. Whenever a terminal employs a low level signal for transmission, suitable strapping arrangements (not shown) are provided to enable one to disconnect the appropriate attenuator(s) 372, 374, or both. Should the transmission revert back to a high level signal transmission, the strapping arrangement is employed to reconnect the appropriate attenuator into the circuit.

The wiring schematics of the terminals 310 and 312 is essentially the same as described heretofore for the two-wire terminals 24 and 32 of FIGS. 3 and 4. Attenuating circuits and means of modifying a two-wire telephone connection for a four-wire telephone connection are well known to those skilled in the art of telephony transmission.

Figure 7:
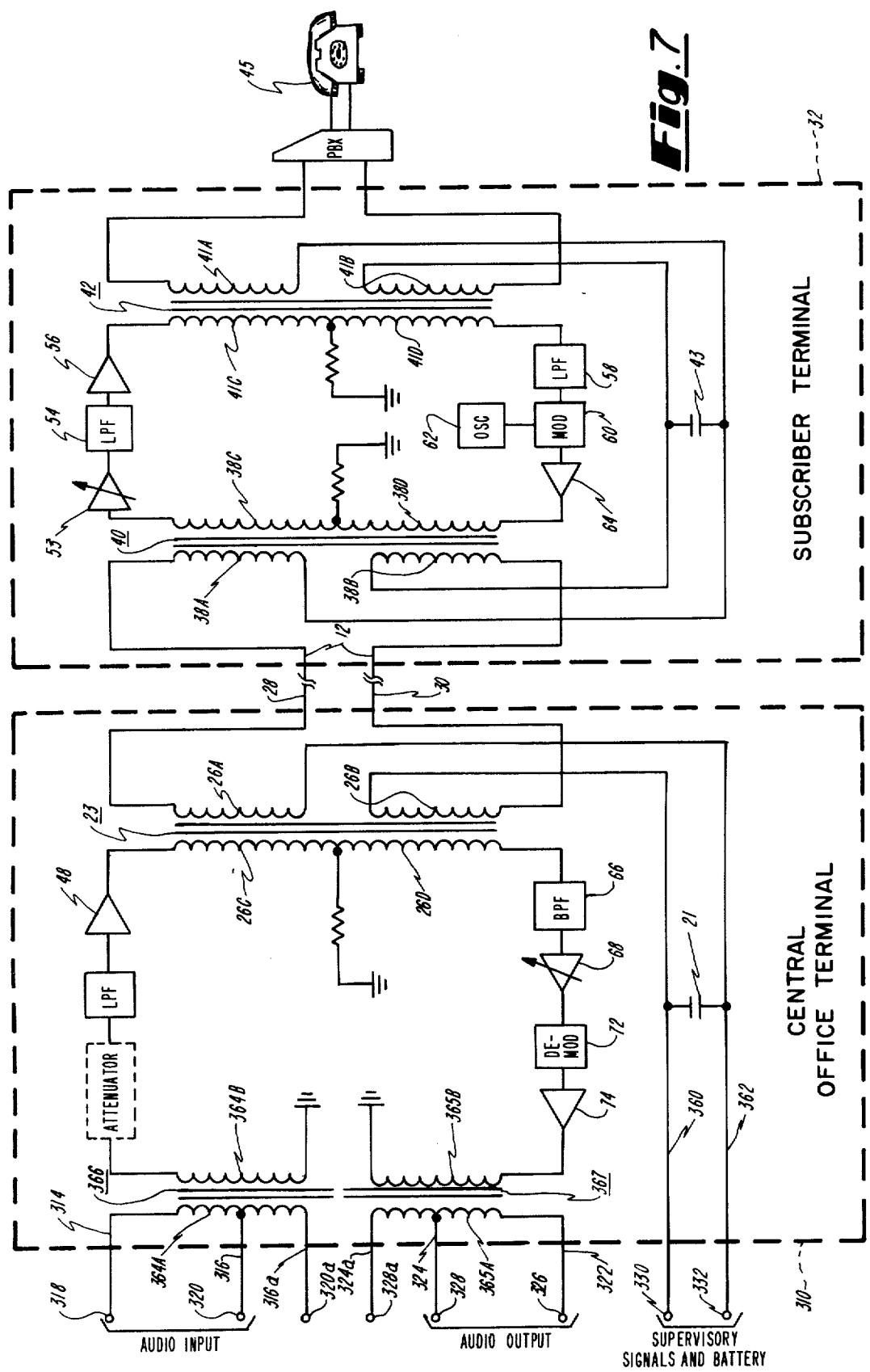
FIG. 7 is a block diagram of an alternate embodiment of the telephone transmission system of FIG. 6.

The novel cable transmission system of this invention which enables one to have two-way transmission over one cable pair by simulating a four-wire transmission path may also be employed in a mix of two-wire and four-wire central office and subscriber terminals. For example, any embodiment of a two-wire central office terminal may be connected by the cable 12 to any embodiment of the four-wire subscriber terminal. Conversely, either version of the two-wire subscriber terminal may be connected to any of the different embodiments of the four-wire central office terminal. This interconnection is possible for all possible situations such, for example, as when the central office terminal is connected between switching equipment of either a central office or a private branch exchange and either switching equipment of another central office or private branch exchange or a subscriber telephone set remote from the premises of a private branch exchange. For example, with reference to FIG. 7, a four-wire configured central office terminal 310 of FIG. 6 is shown connected to a two-wire configured subscriber terminal 32 of FIG. 1. The items having the same reference numbers in both respective figures are the same and function in the same manner as disclosed previously in this specification.

Figure 8:
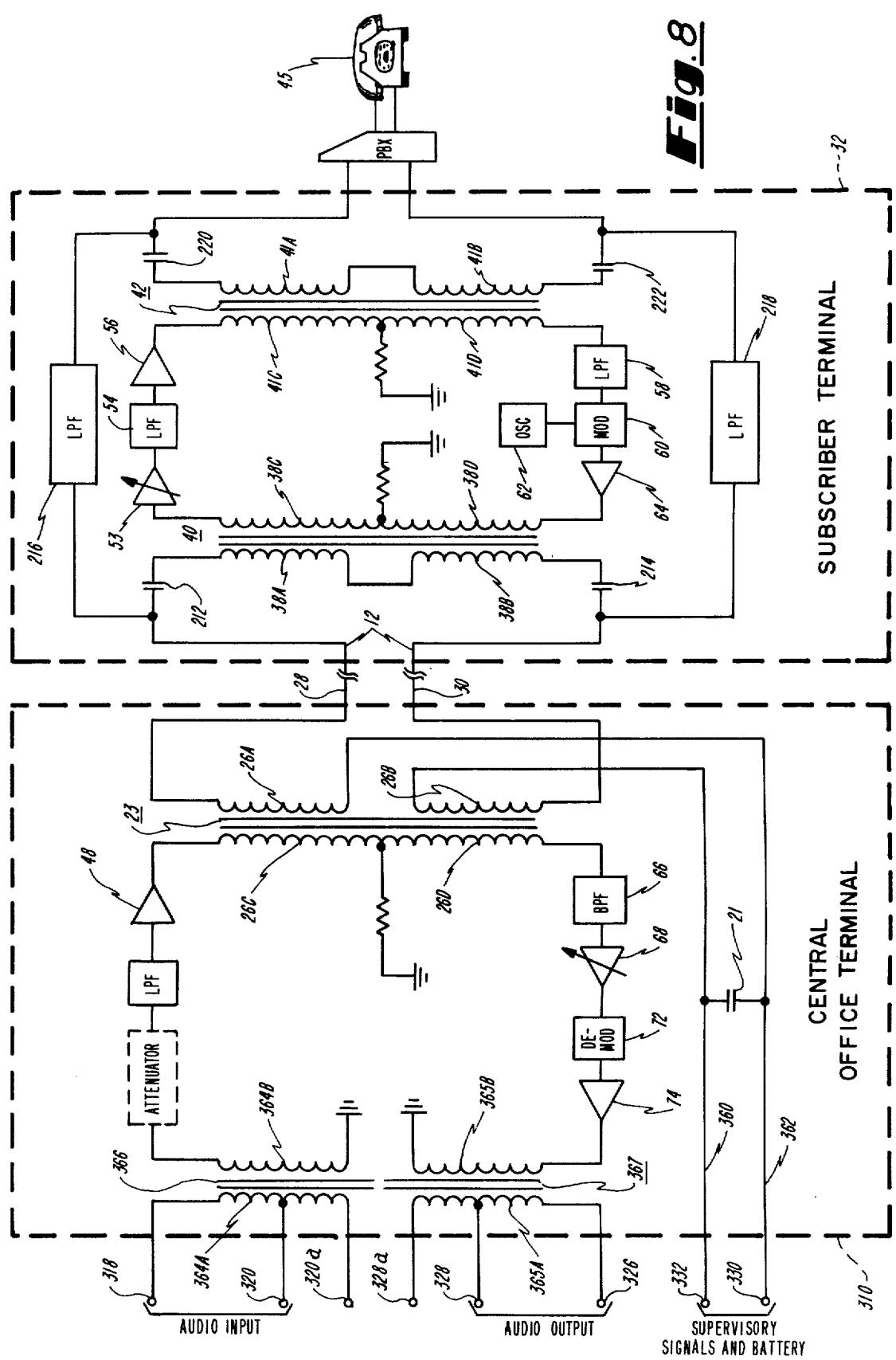
FIG. 8 is a block diagram of still another alternate embodiment of the telephone transmission system of FIG. 6.

A telephone transmission system embodying either one of the terminals 310 or 312 of the system shown in, and described with reference to, FIG. 6 may be connected to the corresponding opposite terminal 32 or 24 respectively of the system shown in, and described with reference to, FIG. 5 by a two-wire, non-loaded, non-equalized cable. Referring now to FIG. 8, and for illustrative purposes only, a telephone system is depicted as embodying a central office terminal 310 and a subscriber terminal 32 connected to each other by the two-wire cable 12. Each of the terminals 310 and 32 function in the exact same manner as described heretofore in this specification. In a similar manner, the central office terminal 24 of FIG. 5 can be connected to the subscriber terminal 312 of FIG. 6.

What is claimed is:
1. A telephone transmission system comprising
   a first pair of terminals for connection to a telephone circuit;

a second pair of terminals for connection to a two-wire line which presents a first impedance at audio frequencies and a second impedance, which is substantially less than said first impedance, at a selected carrier frequency;

a communication circuit including first circuit means connected to said first pair of terminals for transmitting audio signals at audio frequencies from one pair of said first and second pairs of terminals to the other pair of said first and second pair of terminals, and second circuit means connected to said first pair of terminals for transmitting signals from one pair of said first and second pairs of terminals to the other pair of said first and second pairs of terminals in a direction opposite the transmission of said audio signals, said second circuit means including in series a first circuit for transmitting audio modulation carrier signals at carrier frequencies, a second circuit for transmitting audio signals at audio frequencies, and a signal converter circuit connected between said first and second circuits; and third circuit means connecting said first and second circuit means to one end of said two-wire line via said second pair of terminals for producing an impedance match between said communication circuit and said two-wire line at said selected carrier frequency and producing a deliberate impedance mismatch between said communication circuit and said two-wire line at audio frequencies.

2. A telephone transmission system as defined in claim 1 wherein said third circuit means comprises a connection circuit presenting substantially said second impedance to said two-wire line at both audio frequencies and carrier frequencies.

3. A telephone transmission system as defined in claim 2 wherein said connection circuit is a transformer hybrid circuit.

4. A telephone transmission system as defined in claim 2 wherein said first circuit means includes a low pass filter in series with a first amplifier, and wherein said first circuit of said second circuit means includes a bandpass filter for transmitting audio modulated carrier signals in series with a second amplifier, and said second circuit of said second circuit means includes a low pass filter for transmitting audio signals in series with a third amplifier.

5. In a telephone transmission system including a pair of communication circuits, each of said communication circuits having a first pair of terminals for connecting said circuits to a telephone circuit and a second pair of terminals for connecting said circuits to opposite ends of a two-wire line which presents a first impedance to said communication circuits at audio frequencies and presents a second impedance, which is substantially less than said first impedance, to said communication circuits at a selected carrier frequency, each of said communication circuits comprising:

first circuit means for transmitting audio signals at audio frequencies from one pair of said first and second pairs of terminals to the other pair of said first and second pairs of terminals;

second circuit means for transmitting signals from one pair of said first and second pairs of terminals to the other pair of said first and second pairs of terminals in a direction opposite the transmission of said audio signals, said second circuit means including in series a first circuit for transmitting audio modulated carrier signals at carrier frequencies, a second circuit for transmitting audio signals, and a signal converting circuit connected between said first and said second circuits, said first circuit, said second circuit and said signal converting circuit being connected in reverse order in their respective communication circuits;

third circuit means connecting said first and second circuit means to one end of said two-wire line via said second pair of terminals for producing an impedance match between the communication circuit and said two-wire line at said selected carrier frequency and producing a deliberate impedance mismatch between the communication circuit and said two-wire line at audio frequencies.

6. A telephone transmission system as defined in claim 5 wherein said third circuit means comprises a connection circuit presenting substantially said second impedance to said two-wire line at both audio frequencies and carrier frequencies.

7. A telephone transmission system for connection to a two-wire telephone line which presents a first impedance at audio frequencies and presents a second impedance, which is substantially less than said first impedance, at a selected carrier frequency, comprising:

first and second terminals for connection to telephone equipment for translating battery potential and ringing and supervisory signals;

third and fourth terminals for connection to telephone equipment for translating audio frequency signals;

fifth and sixth terminals for connection to telephone equipment for translating audio frequency signals;

seventh and eighth terminals for connection to said two-wire telephone line;

first transformer circuit means having first, second, third and fourth coupled windings;

second transformer circuit means connected in a hybrid circuit configuration presenting an impedance match with said two-wire line at said selected carrier frequency and producing a deliberate impedance mismatch with said two-wire line at audio frequencies, said second transformer circuit means having first, second, third and fourth coupled windings;

first circuit means for connecting the first winding of said first transformer circuit means to said third and fourth terminals;

second circuit means for connecting the second winding of said first transformer circuit means to said fifth and sixth terminals;

third circuit means for connecting one end of each of the first and second windings of said second transformer circuit means to said first and second terminals, respectively, including a capacitor connecting said first and second windings of said second transformer circuit means in series;

fourth circuit means for connecting the other end of each of the first and second windings of said second transformer circuit means to said seventh and eighth terminals, respectively;

fifth circuit means interconnecting the third windings of said first and second transformer circuit means for unidirectionally transmitting audio signals from the third and fourth terminals to the seventh and eighth terminals, and sixth circuit means interconnecting the fourth windings of said first and second transformer circuit means for converting between said audio signals and said audio modulated carrier signals and for unidirectionally transmitting the converted signal from said seventh and eighth terminals to said fifth and sixth terminals.

8. A telephone transmission system as defined in claim 7 wherein said third circuit means comprises a connection circuit presenting substantially said second impedance to said two-wire line at both audio frequencies and carrier frequencies.

* * * * *